Jan. 25, 1966  R. L. CAMPBELL ETAL  3,230,718

TEMPERATURE INDICATOR

Filed March 13, 1962

INVENTORS
RICHARD L. CAMPBELL
DAVID A. WOLCOTT

BY Andrew K. Foulds
their ATTORNEY

United States Patent Office 3,230,718
Patented Jan. 25, 1966

3,230,718
TEMPERATURE INDICATOR
Richard L. Campbell, Birmingham, Mich., and David A. Wolcott, Henrietta, N.Y., assignors to American Radiator & Standard Sanitary Corporation, New York, N.Y., a corporation of Delaware
Filed Mar. 13, 1962, Ser. No. 179,352
9 Claims. (Cl. 73—378.3)

This invention relates to an alarm-type temperature indicator which detects fluid temperature variations from a predetermined value. The invention may be used in a variety of applications, as for example in the indication of abnormally high coolant temperatures in engine cooling systems.

One object of the present invention is to provide an alarm-type temperature indicator in which the indicating element moves with a snap action to thus provide indication immediately on the occurrence of an abnormal temperature condition.

A further object of the invention is to provide an alarm-type temperature indicator which has a rapid response to temperature change.

Another object of the invention is to provide a temperature indicator which operates without the use of auxiliary levers, toggle actions or other mechanical motion-multiplying elements between the temperature sensing portion and the temperature indicating portion.

A further object of the invention is to provide a temperature indicator which has relatively few moving parts and which can be manufactured at relatively low cost.

An additional object of the invention is to provide a temperature indicator which uses relatively small masses of temperature sensing material.

A further object of the invention is to provide a temperature indicator which can be manufactured as a relatively small size device.

Other objects of this invention will appear from the following description and appended claims, reference being had to the accompanying drawings forming a part of this specification wherein like reference characters designate corresponding parts in the several views.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Figure 1:
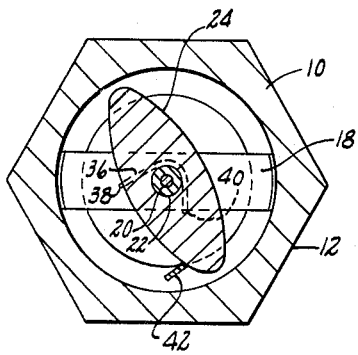
FIGURE 1 is a sectional view of one embodiment of the invention taken on a diametrical plane in FIG. 2.
Figure 2:
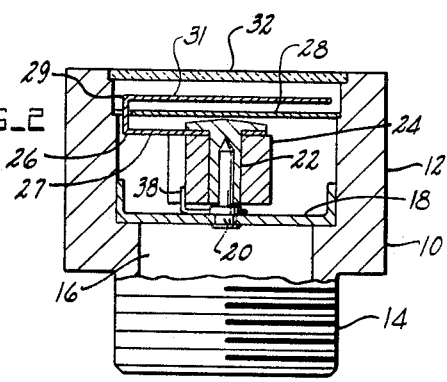
FIG. 2 is a sectional view taken on an axial plane in FIG. 1.

In FIGS. 1 and 2 of the drawings there is shown a temperature indicator comprising a tubular housing structure 10 externally contoured to provide a hexagonal cross sectional portion 12 and a threaded portion 14 for permitting the housing to be readily screwed into a threaded opening in a fluid confining means such as a tank or conduit.

The housing is hollowed to define an internal space 16 for fixedly mounting a temperature-variable magnetically permeable element constructed as a strip 18. As shown in FIG. 1, strip 18 is substantially rectangular in shape so that fluid from the conduit or tank can flow into space 16 and around the major surfaces of the strip, whereby the strip temperature is at any given moment substantially the same as the fluid temperature. Strip 18 is preferably formed at least partly of a material whose magnetic permeability is relatively low in a low temperature range but whose permeability undergoes a rapid transition to a relatively high value when the temperature is increased very slightly above said low temperature range.

As shown in FIG. 2, strip 18 serves as a mounting structure for the upstanding pivot shaft 20. This shaft rotatably mounts a bearing element 22 which carries the oblong permanent magnet 24. Element 22 also carries the indicator element or pointer 26 which, as shown in FIG. 2, has a first portion extending beneath a fixed indicia plate 28, a second portion 29 extending through an aperture in plate 28 and a third portion 31 overlying the indicia plate. A transparent sight glass 32 is fixedly secured to housing 10 to shield pointer 26 from dust or the like. As best seen in FIG. 1, magnet 24 is urged in a clockwise direction by means of a spring 36 having an end portion 38 hooked around a portion of the magnet and having a second end portion 40 hooked over the edge of strip 18. The clockwise movement of magnet 24 may be limited by a stop 42 which may be formed by downwardly striking out a portion of indicia plate 28.

At low fluid temperatures spring 36 is effective to maintain magnet 24 in its illustrated position of rotation. However as the temperature of the fluid surrounding strip 18 rises above a predetermined value the magnetic permeability of strip 18 undergoes a substantial and rapid transitional increase; magnet 24 is thereby rapidly moved counterclockwise to a position wherein strip 18 acts to complete its magnetic circuit. As seen in FIG. 1 the counterclockwise rotation of magnet 24 would be through an arc of about sixty degrees to a position where the magnet is in substantially vertical alignment with strip 18. Spring 36 is preferably a relatively light spring so that it does not interfere with counterclockwise movement of magnet 24 under the force of the magnetic field. When the temperature of the fluid surrounding strip 18 is lowered below the transitional value strip 18 returns to a condition of low magnetic permeability so that spring 36 is then effective to move the magnet clockwise back to its FIG. 1 position. Pointer portion 31 cooperates with suitable indicia on plate 28 to visually denote the two positions of the magnet.

Temperature-sensitive strip 18 is preferably formed partly of a crystalline material having the formula $Mn_{2-x}Cr_xSb_{1-y}In_y$, where $x$ is between .025 and .20 and $y$ is between 0 and .05. The properties of this crystalline material are pointed out in an article entitled "Evidence for an AntiFerromagnetic-Ferrimagnetic Transition in Cr-Modified $Mn_2Sb$" appearing at pages 509 through 511 in Physical Review Letters, volume 4, Number 10, issued May 15, 1960.

Figure 5:
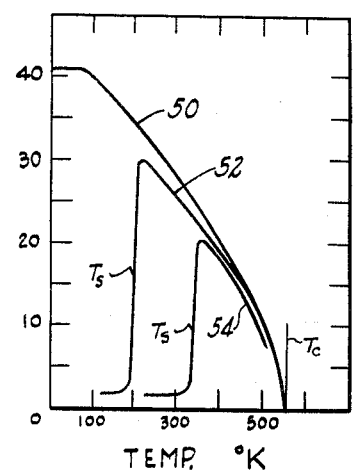
FIG. 5 is a chart illustrating the temperature-magnetic permeability characteristics of a temperature sensing material utilized in the FIG. 1 and FIG. 3 embodiments.
Figure 6:
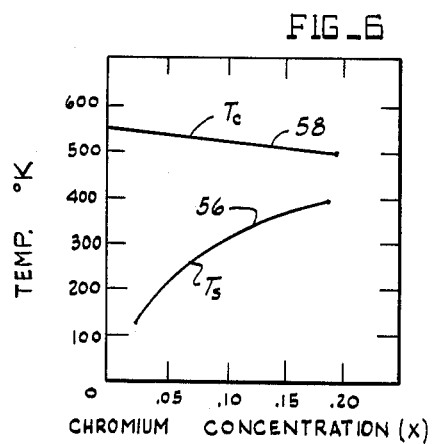
FIG. 6 is a chart illustrating one effect of varying the chromium concentration in the FIG. 5 material.

The article contains two charts which are reproduced in the accompanying drawings as FIGS. 5 and 6. FIG. 5 shows the temperature-magnetic permeability characteristics of three materials, only two of which are suitable for use in this invention. The curve designated generally by numeral 50 is for the crystalline material $Mn_2Sb$. This material has a relatively high magnetic permeability when its temperature is above about 400 degrees K. As its temperature increases above 400 degrees its magnetic permeability slowly decreases until the Curie temperature of about 550 degrees is reached. The rate of change of magnetic permeability of this material is not great, and the material is not particularly useful as a snap action temperature sensing material of the type herein contemplated. Its operating curve is shown because it is representative of the sluggish performance of the Curie point materials which have sometimes been used in the past for temperature indication purposes.

The curve designated generally by numeral 52 is for a crystalline compound having the formula

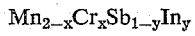

where $x=.05$ and $y=.05$. At temperatures below about 200 degrees K. this material has a very weak magnetic permeability but at about 200 degrees K. the material undergoes a rapid transition from the weak magnetic permeability state to a relatively high magnetic permeability state. The full transition temperature range from the weak state to the high state involves a matter of about ten degrees; however in using the material in a temperature indicator the material need not undergo the entire ten degree temperature change in order to cause a significant movement of magnet 24. In some cases only a partial change in magnetic permeability is sufficient to move the magnet, depending of course on such factors as magnet composition and mass, and spring strength. In many situations a temperature change of one or two degrees provided sufficient magnetic permeability change to operate magnet 24 between its two positions.

In FIG. 5 the curve designated generally by numeral 54 is for the compound $Mn_{2-x}Cr_xSb_{1-y}In_y$ where $x=.13$ and $y=.05$. This material has a transition temperature $T_s$ of approximately 330 degrees K. so that it can be used in an indicator for causing magnet 24 to indicate fluid temperatures above or below 330 degrees K. The material of curve 52 differs from the material of curve 54 in the amount of chromium present in the compound. Thus, varying the chromium concentration varies the transition temperature.

FIG. 6 plots in curve 56 the effect of varying the chromium concentration in the compound

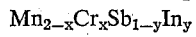

where $y$ is held at .05. The Curie temperature $T_c$ for the materials of the figure is plotted by curve 58. It will be seen that by varying the chromium concentration the transition temperature $T_s$ can be effectively varied from about 100 degrees K. to almost 400 degrees K., whereas the Curie temperature for this general compound can be varied only from about 550 degrees K. to 500 degrees K. By using the $T_s$ temperatures for temperature sensing it is possible to vary the chromium concentration in the compound to provide a variety of indicators for sensing different temperatures. Reliance on the Curie temperature as the sensed condition does not permit the versatility which is provided when the transition temperatures $T_s$ are utilized.

The materials of curves 52 and 54 both contain indium, but it is pointed out in the aforementioned article in Physical Review Letters that indium is not an essential component in the compound. It appears that indium tends to retard the precipitation of $Mn_2Sb$, and that such precipitate is responsible for the small residual permeability possessed by the material in the low temperature range. This small residual magnetic permeability is not a major disadvantage in an indicator of the type herein contemplated, and it is contemplated that the chromium-magnanese-antimony compound can be employed without the indium.

The crystalline chromium-manganese-antimony compound is relatively brittle and subject to fracture. Therefore it is preferably supported on a lamination of a stronger material to form the complete strip 18. Alternately the crystalline material can be incorporated with a resinous binder to form a strip 18 constituted as a crystalline impregnated plastic sheet.

Figure 3:
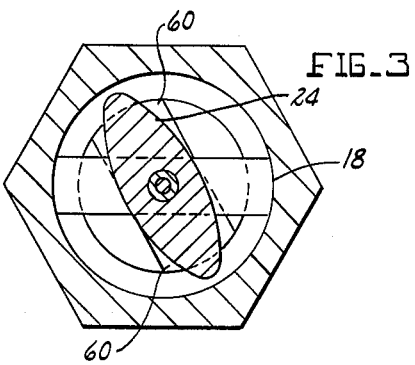
FIG. 3 is a sectional view of a second embodiment of the invention taken on a diametrical plane in FIG. 4.
Figure 4:
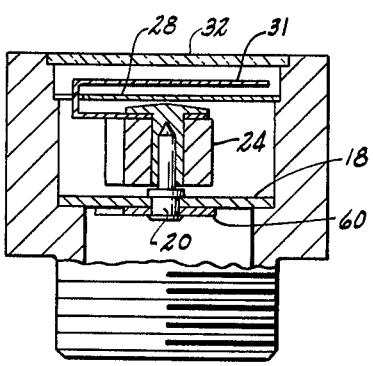
FIG. 4 is a sectional view taken on an axial plane in FIG. 3.

Referring to FIGS. 3 and 4, there is shown an embodiment of the invention which utilizes a magnetically permeable element 60 in place of spring 36. Element 60 may be formed of a material that has a magnetic permeability somewhat above the residual permeability of the temperature sensitive material in strip 18. Alternately element 60 may be formed of high permeable material but with a low mass so that its effect on magnet 24 is less than the effect of strip 18 when the strip is above its transition temperature.

As shown best in FIG. 4, magnetic element 60 is secured to strip 18 through the mechanism of shaft 20. Element 60 extends crosswise of strip 18 so that a low temperatures permanent magnet 24 assumes a position of attraction to element 60; i.e., the permanent magnet lies directly above and in vertical alignment with element 60.

When strip 18 has its temperature raised to the transition value its magnetic permeability is increased sufficiently so that permanent magnet 24 rotates to a position directly overlying strip 18, thus causing pointer portion 31 to register with the abnormal temperature indicia on the upper face of plate 28.

In those instances when the device is to be located in a service installation with shaft 20 in a horizontal direction it is possible to substitute a weight (not shown) for spring 36 or element 60. In such case the weight is carried on magnet 24 in a location to urge the magnet to a position crosswise of strip 18; temperature rises causes the magnet to move into alignment with strip 18 as previously described.

It will be noted that in the illustrated forms of the invention a relatively small temperature change is effective to provide a significant change in magnetic permeability of strip 18 so that magnet 24 has a rapid movement from its illustrated position to its high temperature position. The permeability values for the element 18 material are such that a relatively small mass of material need only be used. When such small masses are used the temperature of element 18 closely follows the temperature of the surrounding atmosphere so that hysteresis effects are minor. This permits the indicator to be used in those installations in which the fluid temperature may be subject to quick change.

In some cases the magnet could be fixed, and the magnetically permeable element movable. Other changes could be made without departing from the spirit of the invention as set forth in the appended claims.

We claim:

1. A temperature indicator comprising a magnet; a thermally-influenced magnetically permeable element disposed for relative movement toward the magnet in response to temperature increase; force means acting to effect relative movement of the permeable element away from the magnet in response to temperature decrease; and an indicator element carried by the movable one of said magnet and permeable element.

2. An alarm type temperature indicator comprising a magnet; a thermally-influenced magnetically permeable element disposed for relative movement toward said magnet in response to temperature increase; and force means acting to effect relative movement of the permeable element away from the magnet in response to temperature decrease; said permeable element comprising a material which has a low permeability at low temperatures, which has a high permeability at higher temperatures, and which undergoes a transition between the high and low permeability states in response to a small temperature change whereby rapidly fluctuating temperatures produce snap action relative movement between the permeable element and magnet; and an indicator element carried by the movable one of said magnet and permeable element.

3. An alarm type temperature indicator comprising a magnet and a thermally-influenced magnetically permeable element disposed adjacent said magnet for relative movement toward and away therefrom in response to temperature change; said magnetically permeable element being formed of a material comprised of chromium, manganese and antimony; and an indicator element carried by the movable one of said magnet and permeable element.

4. An alarm type temperature indicator comprising a magnet; and a thermally-influenced magnetically permeable element disposed adjacent said magnet for relative movement toward and away therefrom in response to temperature change; said magnetically permeable element being formed of a material comprising the compound $Mn_{2-x}Cr_xSb_{1-y}$, where $x$ is between .025 and .20, and $y$ is between 0 and .05; and an indicator element carried by the movable one of said magnet and permeable element.

5. An alarm type fluid temperature indicator comprising a housing defining a fluid reception space; a thermally-influenced magnetically permeable element disposed within said space so that its temperature changes according as the space temperature changes; said element being formed of a material comprising the compound $$Mn_{2-x}Cr_xSb_{1-y}$$

where $x$ is between .025 and .20, and $y$ is between 0 and .05; the combination further comprising a magnet movably disposed within the housing to assume a first position attracted toward the permeable element and a second position away from the permeable element; force means acting on said magnet to move same toward the second position when the space temperature is below a predetermined value; and an indicator element carried by the magnet.

6. The combination of claim 5 wherein the force means comprises a spring.

7. The combination of claim 5 wherein the force means comprises a thermally stable magnetic element.

8. A fluid temperature indicator comprising a hollow tubular housing defining a space for the admission of fluid thereto; a strip of temperature-variable magnetically permeable material extending across said space at right angles to the housing axis; a pivot shaft extending within the space along the housing axis; an elongated permanent magnet rotatably mounted at its midpoint on said pivot shaft for arcuate movement between a first position extending parallel to said strip and a second position extending crosswise of said strip; temperature indicia means carried by the housing structure; a pointer carried by said permanent magnet and cooperable with the indicia to indicate the magnet position; and force means tending to rotate the magnet from its first position toward its second position.

9. The combination of claim 8 wherein the permeable material comprises the compound $Mn_{2-x}Cr_xSb_{1-y}$, where $x$ is between .025 and .20 and $y$ is between 0 and .05.

References Cited by the Examiner

UNITED STATES PATENTS

| | | | |
|---|---|---|---|
| 1,950,141 | 3/1934 | Hastings | 73—349 |
| 2,339,087 | 1/1944 | Montz | 200—88.6 |
| 2,751,483 | 6/1956 | Keen et al. | 200—88.6 |
| 2,976,379 | 3/1961 | Rhodes | 200—87 |

FOREIGN PATENTS

| | | |
|---|---|---|
| 135,628 | 12/1949 | Australia. |
| 612,802 | 11/1948 | Great Britain. |

OTHER REFERENCES

Physical Review Letters, vol. 4, No. 10, May 15, 1960, pages 509–511 relied on.

ISAAC LISANN, *Primary Examiner*.